(12) United States Patent
Spitzer et al.

(10) Patent No.: US 10,906,016 B2
(45) Date of Patent: Feb. 2, 2021

(54) METHOD FOR MANUFACTURING NANOPARTICLES BY DETONATION

(71) Applicants: ISL—Institut franco-allemand de recherches de Saint-Louis, Saint-Louis (FR); CENTRE NATIONAL DE LA RECHERCHE SCIENTIFIQUE (C.N.R.S), Paris (FR)

(72) Inventors: Denis Spitzer, Oberschaeffolsheim (FR); Vincent Pichot, Mulhouse (FR); Benedikt Risse, Wittlingen (DE)

(73) Assignees: ISL—Institut Franco-allemand de recherches de Saint-Louis, Saint-Louis (FR); CENTRE NATIONAL DE LA RECHERCHE SCIENTIQUE (C.N.R.S.), Paris (FR)

( * ) Notice: Subject to any disclaimer, the term of this patent is extended or adjusted under 35 U.S.C. 154(b) by 116 days.

(21) Appl. No.: 14/382,200

(22) PCT Filed: Feb. 28, 2013

(86) PCT No.: PCT/EP2013/054107
§ 371 (c)(1),
(2) Date: Aug. 29, 2014

(87) PCT Pub. No.: WO2013/127967
PCT Pub. Date: Sep. 6, 2013

(65) Prior Publication Data
US 2015/0157997 A1 Jun. 11, 2015

(30) Foreign Application Priority Data
Feb. 29, 2012 (FR) .................................... 12 00602

(51) Int. Cl.
*B01J 3/08* (2006.01)
*C06B 25/04* (2006.01)
(Continued)

(52) U.S. Cl.
CPC ................. *B01J 3/08* (2013.01); *C01B 32/26* (2017.08); *C06B 25/04* (2013.01); *C06B 25/34* (2013.01)

(58) Field of Classification Search
CPC ........................................................ B01J 3/08
See application file for complete search history.

(56) References Cited

U.S. PATENT DOCUMENTS

| 7,862,792 B2 | 1/2011 | Dolmatov |
| 2009/0004092 A1 | 1/2009 | Dolmatov |

(Continued)

FOREIGN PATENT DOCUMENTS

WO 2013/117671 8/2013

OTHER PUBLICATIONS

Deagglomeration of Detonation Nanodiamonds Nanoscience and Nanotechology Letters vol. 3, 68-74, 2011.*
(Continued)

*Primary Examiner* — Larry W Thrower
(74) *Attorney, Agent, or Firm* — Troutman Pepper Hamilton Sanders LLP

(57) ABSTRACT

The present invention relates to the field of manufacturing nanoparticles, and specifically to a method for manufacturing diamond nanoparticles, or nanodiamonds, by detonation at least one explosive charge, wherein said at least one explosive charge is nanostructured.

25 Claims, 4 Drawing Sheets

(51) Int. Cl.
*C06B 25/34* (2006.01)
*C01B 32/26* (2017.01)

(56) References Cited

U.S. PATENT DOCUMENTS

2010/0206441 A1* 8/2010 Baran, Jr. ............. C06B 23/002
149/1
2010/0254884 A1* 10/2010 Shenderova ............. B82Y 5/00
423/446
2010/0278712 A1 11/2010 Swanson

OTHER PUBLICATIONS

Kuznetsov V, et al. "Study of Ultradispersed Diamond Powders Obtained Using Explosion Energy" Carbon 1991, 29:(4-5)665-668.
Kuznetsov V, et al. "Onion-like carbon from ultra-disperse diamond" Chemical Physics Letters 1994, 222:343-348.
International Search Report dated May 22, 2013, which issued during prosecution of International Application No. PCT/EP2013/054107, which corresponds to the present application.
Bai, Peikang et al. "Effect of laser parameters on the size and fluorescence of nanodiamonds formed upon pulsed-laser irradiation" Materials Research Bulletin 2010, 45:826-829.
Hu, Shenliang et al. "The formation of multiply twinning structure and photoluminescence of well-dispersed nanodiamonds produced by pulsed-laser irradiation" Diamond & Related Materials 2008, 17:142-146.

* cited by examiner

METHOD FOR MANUFACTURING NANOPARTICLES BY DETONATION

CROSS-REFERENCE TO RELATED APPLICATIONS

The present application is the U.S. National Stage of International Application No. PCT/EP2013/054107 filed on Feb. 28, 2013, which claims priority to French Application No. FR 1200602 filed Feb. 29, 2012. The International Application published as WO 2013/127967 on Sep. 6, 2013. All of the above applications are herein incorporated by reference in their entireties.

FIELD OF THE INVENTION

The present invention relates to the field of manufacturing nanoparticles and the object thereof is most particularly a method for manufacturing nanoparticles of diamond, or nanodiamonds, by detonation of at least one explosive charge.

BACKGROUND

One of the major challenges of the production of nanodiamonds is to obtain mass production and that the size of the obtained nanodiamonds be less than 5 nm. Indeed, the particles of nanodiamonds of very small sizes are of interest to several fields like:
- the medical field, notably through the use of diamond nanoparticles used as vectors on which are grafted drug molecules for treating degenerative diseases. This type of application requires significant amounts of products, of the order of 100 mg per test. Ultra-small diamond nanoparticles are good carriers because of their effectiveness for attaining the core of a cell and fooling the macrophage system of the latter because of their small size, thereby making the treatment effective. Here, it is insisted on the fact that the nanodiamond is probably one of the only species which is biocompatible and this over a long time;
- precursors of microscopic pads with a microscopic side size, obtained by CVD (Chemical Vapor Deposition) growth. Indeed, deposits of nanodiamonds with very high particulate densities are used as growth precursors notably for making various objects, insulating pads, the use of which is provided in living or physiological environments, for example retinal regeneration. There also, the smaller the initial particles the denser will be the growth precursor deposits and the thinner will be the electrodes obtained by CVD growth;
- very fine nanoparticles, for example nanodiamonds, are of high interest as regards optical protection by their non-linear response to certain wave lengths;
- ultra-thin diamond nanoparticles may also have very strong fields of application in hardening or in accessing multifunctionality of certain polymers of the Kevlar type or other analog polymers.

Processes for producing diamond nanoparticles exist.

Nevertheless these known processes do not always give the possibility of obtaining particle sizes of nanodiamonds of less than 5 nm.

Other known processes do not allow production of large amounts of diamond nanoparticles within reasonable times. Known processes have reduced production capacities.

Thus, processes are known using a laser or an acetylene flame giving the possibility of obtaining nanoparticles with grain size distributions of less than 5 nm. The documents <<The formation of multiple twinning structure and photoluminescence of well-dispersed nanodiamonds produced by pulsed-laser irradiation, Diamond & Related Materials Research Bulletin 17 (2008) 142-146>> and <<Effect of laser pulse parameters on the size and fluorescence of nanodiamonds formed upon pulsed-laser irradiation, Materials Research Bulletin 45 (2010) 826-829>> describe processes for manufacturing nanodiamonds with a laser. But these different manufacturing techniques do not allow mass production of nanodiamonds, their production capacities being too low (of the order of one milligram).

The manufacturing of nanodiamonds by explosive detonation is also known which allows mass production of nanodiamonds (the firing of a conventional of explosive charge of 250 g produces about 12 g of nanodiamonds). This method is for example described in patent publications US2010254884, US2010278712 and US2009004092. The present state of the art of the production by explosive detonation uses explosive particles of a micrometric size and only a very low mass fraction of the obtained nanodiamond particles with this type of process have a size of less than 5 nm.

SUMMARY

There exists a need for a method for manufacturing nanoparticles which provides solutions to the problems of known processes. The invention relates to a method for manufacturing nanoparticles, notably diamond nanoparticles which provides solutions to all or part of the problems of known methods.

The method according to the invention allows mass manufacturing of nanoparticles within a reduced time.

Further, the method according to the invention allows mass manufacturing of nanoparticles and for which the maximum of produced nanoparticles have a size of less than 5 nm.

Advantageously, the method of the invention allows manufacturing of nanoparticles for which the deviation of sizes between these nanoparticles is as reduced as possible in order to obtain a homogeneous size among these nanoparticles.

More advantageously, the method according to the invention may be applied on an industrial scale.

The invention provides a method for manufacturing nanoparticles by detonation of at least one explosive charge for which said at least one explosive charge is nanostructured.

By the term of <<nanostructured>>, is meant that the explosive charge has a nanometric size structure.

Preferably, the nanoparticles obtained according to the method of invention are diamond nanoparticles, further called nanodiamonds.

Also preferably, the nanoparticles obtained according to method of invention are nanoparticles of metal oxide.

Preferably, the metal oxide is selected from boron oxide, iron oxide, nickel oxide, chromium oxide, zirconium oxide, titanium oxide, silicon oxide, tungsten oxide, manganese oxide, vanadium oxide, copper oxide, zinc oxide, molybdenum oxide, niobium oxide and nitrium oxide.

Also preferably, the nanoparticles obtained according to the method of the invention have a size ranging from 1 to 10 nm, advantageously ranging from 1 to 7 nm, more advantageously less than 5 nm.

The method according to the invention applies the detonation of at least one explosive charge. The explosive charge is preferably formed with explosive particles produced according to flash nebulization.

The explosive particles are preferably obtained according to a flash nebulization-evaporation process, and more particularly according to the method described in international application PCT/EP2013/052478.

The method described in international application PCT/EP2013/052478 comprises the successive steps of:
- preparing a solution comprising at least one organic or mineral compound and at least one solvent;
- heating the solution, under a pressure ranging from 3 to 300 bars, at a temperature above the boiling point of the solvent or at a temperature above the boiling point of the mixture of solvents;
- atomizing the solution in an atomization chamber by means of at least one dispersion device and under an angle ranging from 30 to 150° at a pressure ranging from 0.0001 to 2 bars;
- separating the solvent in a gaseous form.

Preferably, the method described in international application PCT/EP2013/052478 is adapted to the preparation of explosive particles.

The explosive particles, obtained according to methods described in international application PCT/EP2013/052478, preferably have a size of less than 1,000 nm, preferably less than 250 nm and more preferably less than 100 nm.

Preferably, the explosive particles forming at least one explosive charge have a size comprised to 100 and 1,000 nm.

Also preferably, the explosive particles have a size comprised between 2 and 200 nm, advantageously between 2 and 100 nm and more advantageously between 2 and 50 nm.

The explosive particles preferably include at least one explosive compound.

The explosive compound is preferably selected from nitramines, nitric esters, and nitroaromatic substances and energy organometallic substances.

Advantageously, the explosive compound is selected from the group formed with cyclotrimethylenetrinitramine (RDX), trinitrotoluene (TNT), hexanitrostylene (HNS), octogen (HMX), triaminotrinitrobenzene (TATB), pentrite (PETN), nitrocellulose, hexanitrohexaazaisowurtzitane (CL20), bis-5-nitrotetrazole tetramine cobalt perchlorate (BNCP) and any of their mixtures.

More advantageously, the explosive compound is a mixture of RDX and of TNT. This mixture is commonly called hexolite.

Explosive particles may further comprise a non-explosive compound.

Preferably the non-explosive compound is a dopant compound.

Advantageously, the dopant compound is an organic compound.

More advantageously, the organic compound is melanin or hexamine.

Also advantageously, the dopant compound is an inorganic compound.

More advantageously, the inorganic compound is selected from inorganic precursors, is preferably selected from compounds comprising boron, compounds comprising iron, compounds comprising nickel, compounds comprising chromium, compounds comprising zirconium, compounds comprising titanium, compounds comprising silicon, compounds comprising tungsten, compounds comprising manganese, compounds comprising vanadium, compounds comprising copper, compounds comprising zinc, compounds comprising molybdenum, compounds comprising niobium, compounds comprising nitrium.

Preferably, the detonation of at least one explosive charge is carried out in the presence of a cooling medium.

Preferably, the cooling medium is water.

The method for manufacturing nanoparticles preferably includes the successive steps of:
- preparing an explosive charge formed with explosive particles;
- detonating the explosive charge in the presence of a cooling medium;
- purifying the nanoparticles.

Another aspect of the invention provides a method for manufacturing nanoparticles preferably including the following steps of:
- mixing explosive particles and at least non-explosive compounds;
- preparing an explosive charge with the mixture obtained earlier;
- detonating the explosive charge in the presence of a cooling medium;
- purifying the nanoparticles.

BRIEF DESCRIPTION OF THE DRAWINGS

Other advantages and features will become apparent in the description of a particular embodiment of the invention with reference to the examples and appended figures wherein.

DETAILED DESCRIPTION

Figure 1:
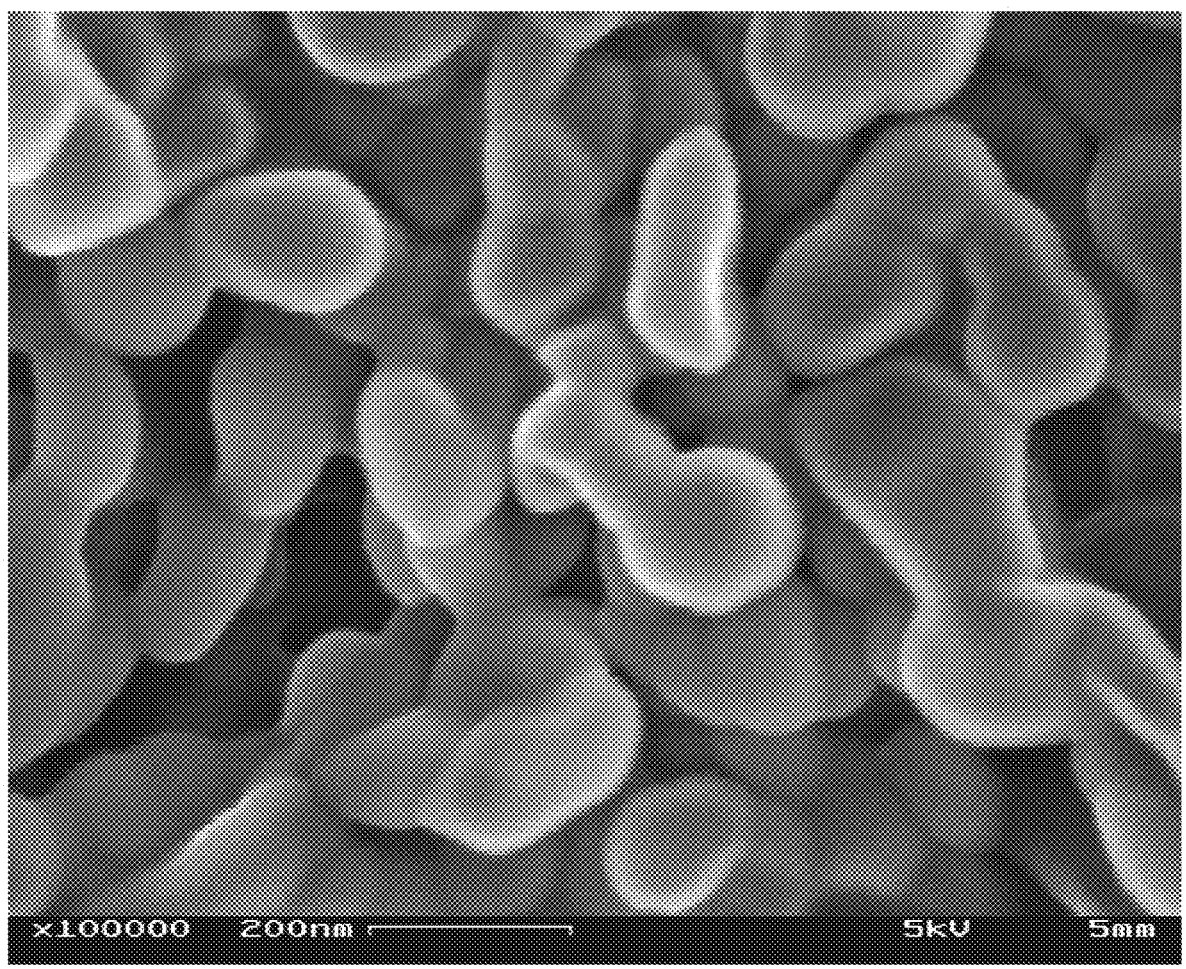
FIG. 1 shows a photograph of a microscopic view of a nanostructured explosive charge according to an example of the invention.

FIG. 1 shows a photograph of a microscopic view of an explosive charge according to a first embodiment of the invention. The explosive nanoparticles have a size varying between 100 nm and 1,000 nm.

The nanostructured explosive charge is made from explosive particles obtained according to the method described in international application PCT/EP2013/052478. These particles are then compacted according to a standard method known to one skilled in the art in the manufacturing of nanostructured explosive charges. According to an example of the invention, the explosive charge is a hexolite charge of 30 grams.

Figure 2:
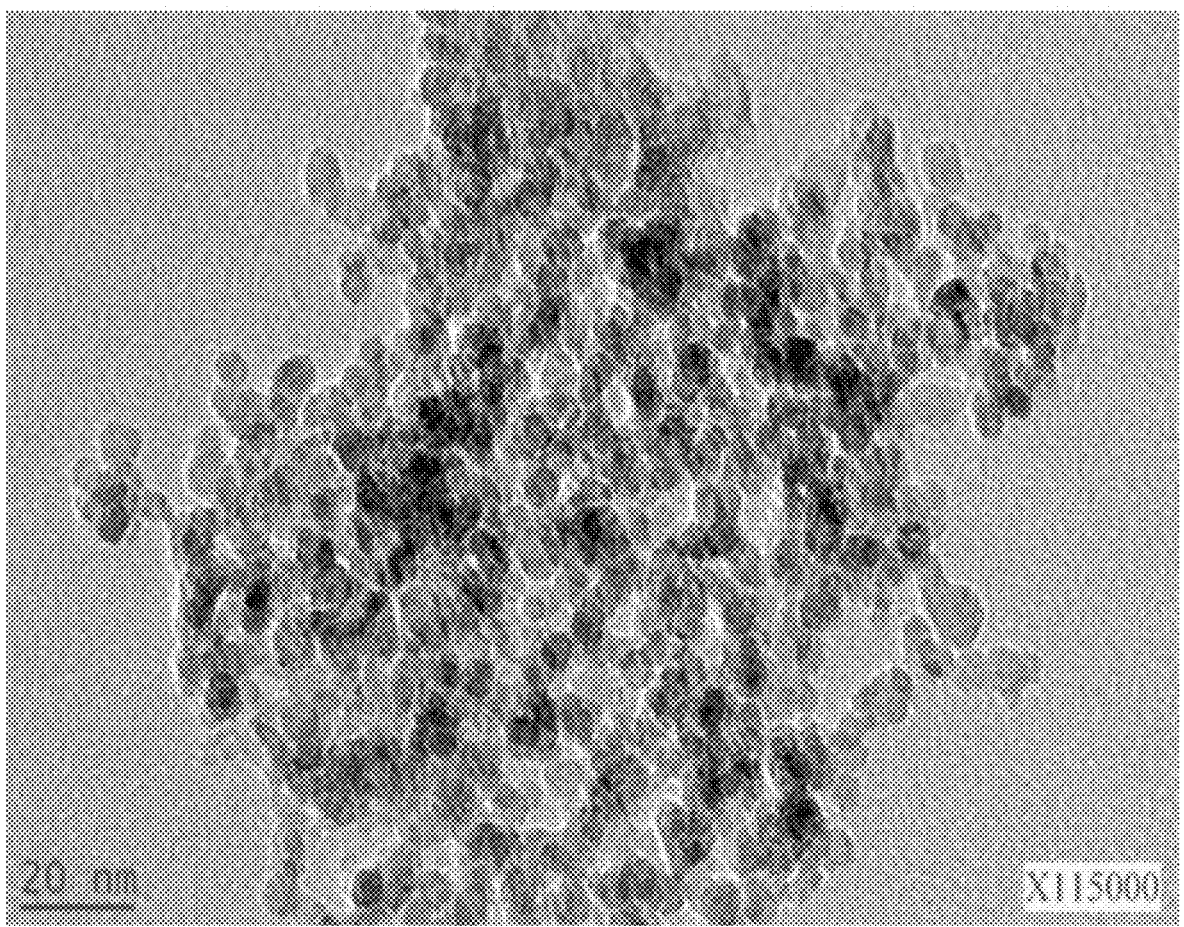
FIG. 2 shows a photograph of nanodiamonds obtained by using a microstructured explosive charge.

FIG. 2 shows a photograph of nanodiamonds obtained by using a microstructured explosive charge. The nanodiamonds are spherical particles for which the average size of the whole of the particles is close to 7 nm. The explosive charge used for manufacturing the nanodiamonds is a microstructured hexolite charge of 30 g. The explosive particles which form the explosive charges have sizes varying from 5 to 100 μm.

Figure 3:
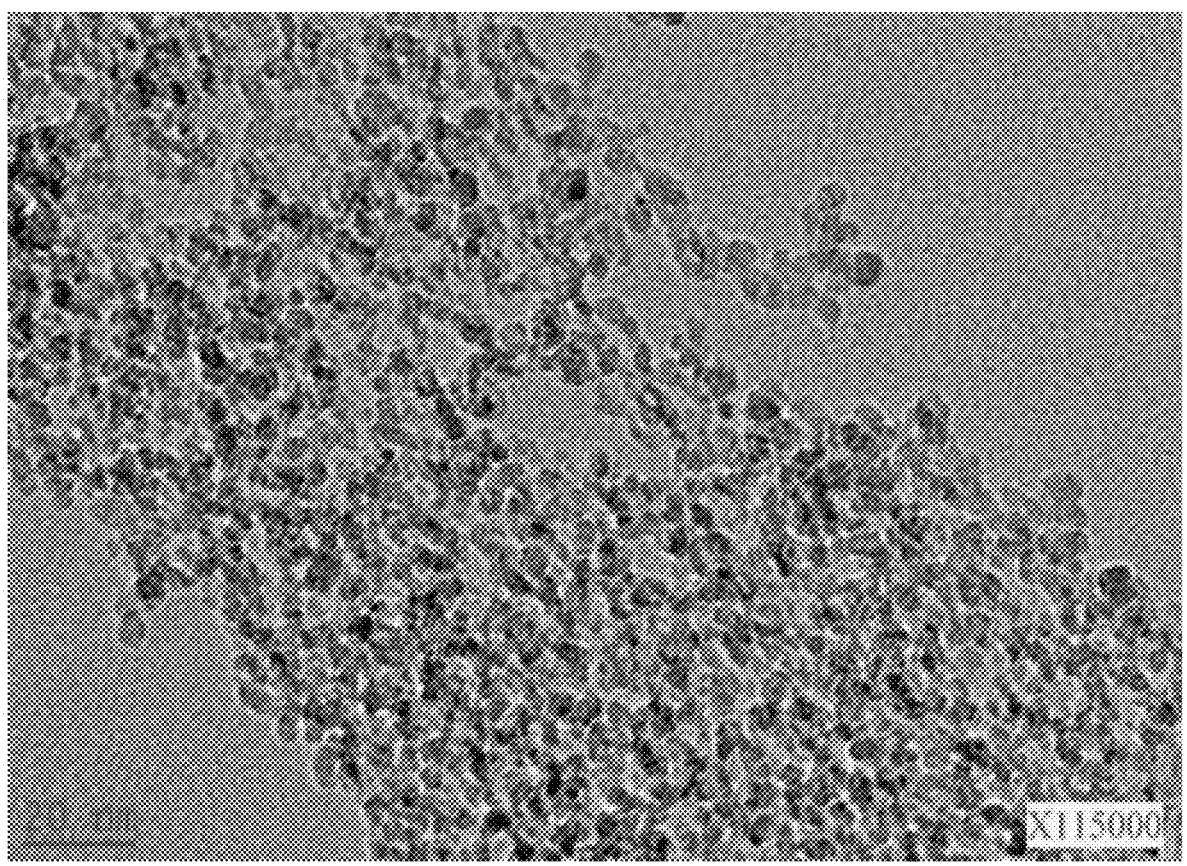
FIG. 3 shows a photograph of nanodiamonds obtained by using a nanostructured explosive charge according to another example of the invention.

FIG. 3 shows a photograph of nanodiamonds obtained by using a nanostructured explosive charge. The nanodiamonds are spherical particles for which the average size of the whole of the particles is close to 4 nm. The explosive charge used for manufacturing the nanodiamonds is a nanostructured hexolite charge of 30 grams. The explosive particles which forms the charge have sizes varying to 100 to 200 nm.

Figure 4A:
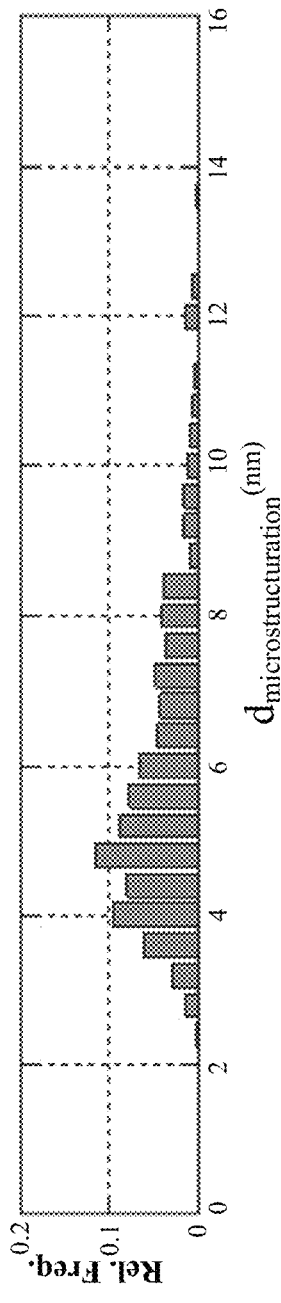
FIGS. 4A-4C shows a graph illustrating the distribution of sizes of the diamond nanoparticles versus the two types of explosive charges used in FIGS. 2 and 3.
Figure 4B:
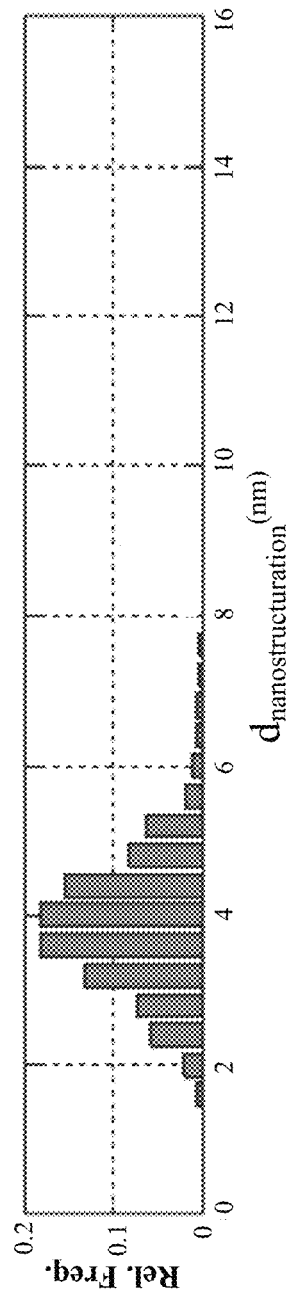
Figure 4C:
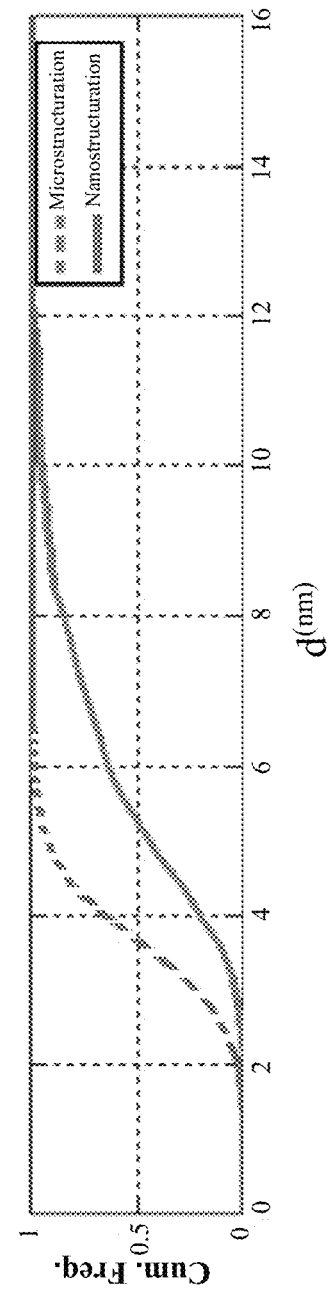

FIGS. 4A-4C shows a graph illustrating the distribution of the sizes of the diamond nanoparticles versus the two types of explosive charges used in FIGS. 2 and 3. The nanodiamonds obtained with a microstructured explosive charge have sizes varying from 3 to 12 nm and for which more than 50% of nanodiamonds have a size greater than 5 nm. The nanodiamonds obtained with a nanostructured explosive charge have sizes varying from 1.5 to 7 nm, and nearly 90% of the nanodiamonds have a size of less than 5 nm.

The use of a nanostructured explosive charge in the method according to the invention instead of a microstructured explosive charge gives the possibility of obtaining diamond nanoparticles for which the size is less than 5 nm with a yield of about 90%. The manufacturing method according to the invention also has an economic interest since it gives the possibility of strongly lowering the rejection rate of nanodiamonds which are bigger than 5 nm.

Many modifications may be provided to the exemplary embodiment of the invention, for example:
- an explosive charge with a different chemical compositions may be used;
- the explosive particles may be made with a method other than flash nebulization-evaporation;
- the explosive charge may be sub-microstructured, i.e. it consists of explosive particles with sizes ranging from 100 nm to 1,000 nm.

The preparation of nanoparticles according to the invention will now be described for a particular embodiment by means of the examples which follows.

EXAMPLES

Example 1

Preparation of an Explosive Charge Formed with RDX-TNT Particles a) Preparation of RDX-TNT Particles 1.2 g (60% by weight) of RDX (cyclotrimethylenetrinitramine) and 0.8 g (40% by weight) of TNT (trinitrotoluene) were dissolved in 500 ml of acetone. The solution is then heated to 150° C. under a pressure of 25 bars. By means of a nozzle with a hollow cone, the solution was dispersed in an atomization chamber and an atomization angle of 60°. The pressure in the atomization chamber was 5 mbars. The separation of the particles was carried out by means of two axial cyclones in parallel. After one hour, 0.75 g of RDX-TNT particles are obtained. The size of the RDX-TNT particles, as evaluated by atomic force microscopy, is comprised between 40 nm and 400 nm with the average size of RDX-TNT particles being about 100 nm.

b) Preparation of an Explosive Charge 30 g of RDX-TNT particles obtained according to the method described in Example 1. a) are compressed at room temperature in order to obtain a nanostructured explosive charge.

Example 2

Manufacturing Diamond Nanoparticles

The explosive charge obtained according to the method described in Example 1.b) is placed in a pocket filled with water suspended in the center of a steel detonation tank. The detonation of the explosive charge is initiated by sending an electric pulse from a detonator. The diamond nanoparticles formed after detonation are suspended in the air and are gradually deposited on the walls of the tank as black-colored soot. The black-colored soot is collected, filtered and then dissolved in an acid solution. The thereby obtained solution is filtered and the diamond nanoparticles are then collected with a selective oxidation treatment.

The nanoparticles obtained have an average size of 4.2 nm. The maximum size of the synthesized nanodiamonds is 8 nm. 20% by mass of the nanodiamonds obtained have a size of less than 3 nm.

Comparative Example 3

Manufacturing of Diamonds Nanoparticles by Means of a Microstructure Explosive Charge The method according to Example 2 was repeated, but with 30 g of a microstructured explosive charge comprising RDX-TNT, having sizes in the micrometric range.

The obtained nanodiamonds have an average size of de 6.3 nm. The maximum size of the obtained nanodiamonds is 23 nm. 4% by mass of the nanodiamonds have a size of less than 3 nm.

The invention claimed is:

1. A method for producing nanodiamonds, wherein said method comprises: detonating at least one nanostructured explosive charge formed by explosive particles having a size of less than 250 nm and obtaining nanodiamonds.

2. The method according to claim 1, wherein the nanodiamonds have a maximum size of 8 nm.

3. The method according to claim 1, wherein the explosive particles have a size comprised between 2 and 200 nm.

4. The method according to claim 1, wherein the explosive particles comprise at least one explosive compound.

5. The method according to claim 1, wherein the explosive particles further comprise a non-explosive compound.

6. The method according to claim 5, wherein the non-explosive compound is an organic compound.

7. The method according to claim 5, wherein the non-explosive compound is an inorganic compound.

8. The method according to claim 1, wherein the method further comprises successive steps of:
   preparing a nanostructured explosive charge formed with explosive particles;
   detonating the nanostructured explosive charge in the presence of a cooling medium; and
   purifying the nanodiamonds.

9. The method according to claim 1, wherein the method further comprises the successive step of:
   mixing explosive particles and at least one non-explosive compound to obtain a mixture;
   preparing the nanostructured explosive charge with said mixture;
   detonating the nanostructured explosive charge in the presence of a cooling medium;
   obtaining nanodiamonds; and
   purifying said nanodiamonds.

10. The method according to claim 1, wherein the nanodiamonds are metal oxide nanoparticles.

11. The method according to claim 10, wherein the metal oxide is selected from boron oxide, iron oxide, nickel oxide, chromium oxide, zirconium oxide, titanium oxide, silicon oxide, tungsten oxide, manganese oxide, vanadium oxide, copper oxide, zinc oxide, molybdenum oxide, niobium oxide and nitrium oxide.

12. The method according to claim 1, wherein the nanostructured explosive charge is obtained by explosive particles produced according to flash nebulization.

13. The method according to claim 1, wherein the nanostructured explosive charge is obtained by:
preparing a solution comprising at least one organic or mineral compound and at least one solvent;
heating the solution, under a pressure ranging from 3 to 300 bars, at a temperature above the boiling point of the solvent or at a temperature above the boiling point of the mixture of solvents;
atomizing the solution in an atomization chamber by means of at least one dispersion device and under an angle ranging from 30 to 150° at a pressure ranging from 0.0001 to 2 bars; and
separating the solvent in a gaseous form, thereby obtaining said nanostructured explosive charge.

14. The method according to claim 4, wherein the explosive compound is selected from the group formed with cyclotrimethylenetrinitramine (RDX), trinitrotoluene (TNT), hexanitrostylene (HNS), octogen (HMX), triaminotrinitrobenzene (TATB), pentrite (PETN), nitrocellulose, hexanitrohexaazaisowurtzitane (CL20), bis-5-nitrotetrazole tetramine cobalt perchlorate (BNCP) and any of their mixtures.

15. The method according to claim 4, wherein the explosive compound is a mixture of cyclotrimethylenetrinitramine (RDX) and trinitrotoluene (TNT).

16. The method according to claim 8, wherein the cooling medium is water.

17. A method for producing nanodiamonds, wherein said method comprises: detonating at least one nanostructured explosive charge formed by explosive particles having a size of less than 250 nm and obtaining nanodiamonds wherein more than 75% of nanodiamonds produced have a size of less than 5 nm.

18. The method according to claim 17, wherein the nanostructured explosive charge is obtained by explosive particles produced according to flash nebulization.

19. The method according to claim 17, wherein said nanostructured explosive particles comprise at least one explosive compound and wherein said explosive compound is selected from the group formed with cyclotrimethylenetrinitramine (RDX), trinitrotoluene (TNT), hexanitrostylene (HNS), octogen (HMX), triaminotrinitrobenzene (TATB), pentrite (PETN), nitrocellulose, hexanitrohexaazaisowurtzitane (CL20), bis-5-nitrotetrazole tetramine cobalt perchlorate (BNCP) and any of their mixtures.

20. The method according to claim 17, wherein said explosive particles comprise at least one explosive compound and wherein said explosive compound is a mixture of cyclotrimethylenetrinitramine (RDX) and trinitrotoluene (TNT).

21. The method according to claim 1, wherein said explosive particles have a size comprised between 2 and 100 nm.

22. The method according to claim 1, wherein said explosive particles have a size comprised between 2 and 50 nm.

23. The method according to claim 17, wherein said explosive particles have a size comprised between 2 and 200 nm.

24. The method according to claim 17, wherein said explosive particles have a size comprised between 2 and 100 nm.

25. The method according to claim 17, wherein said explosive particles have a size comprised between 2 and 50 nm.

* * * * *